Figure 1:
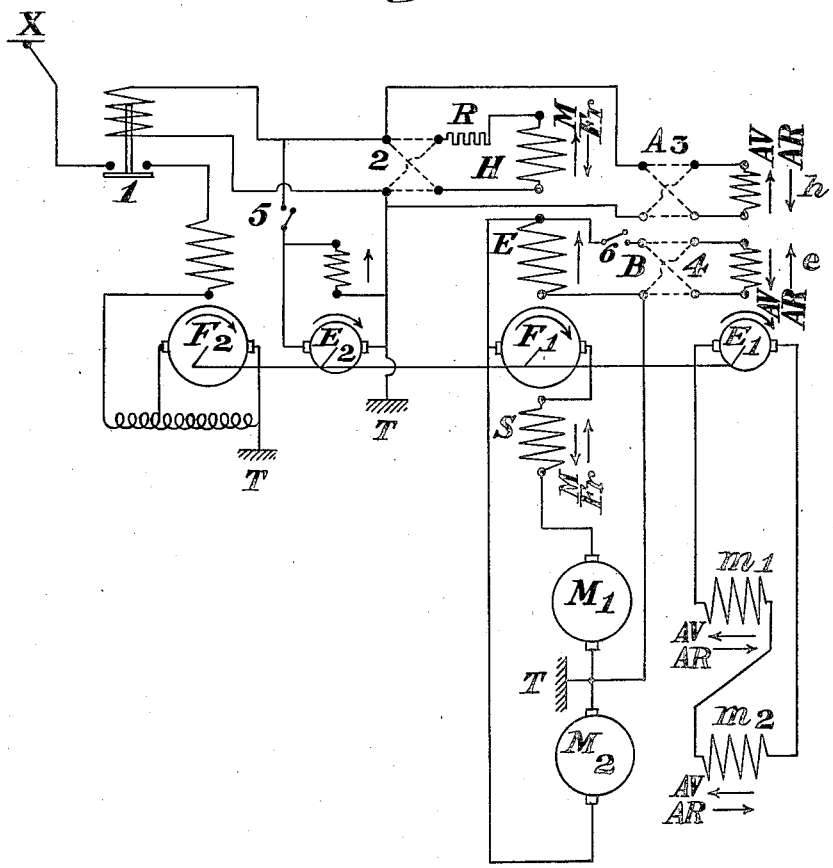

F. CUMONT.
STARTING AND REGULATING OF THE SPEED OF DYNAMO ELECTRIC MACHINES.
APPLICATION FILED JAN. 16, 1914.

1,185,379.

Patented May 30, 1916.
2 SHEETS—SHEET 2.

UNITED STATES PATENT OFFICE.

FERNAND CUMONT, OF PARIS, FRANCE.

STARTING AND REGULATING OF THE SPEED OF DYNAMO-ELECTRIC MACHINES.

1,185,379. Specification of Letters Patent. Patented May 30, 1916.

Application filed January 16, 1914. Serial No. 812,461.

*To all whom it may concern:*

Be it known that I, FERNAND CUMONT, a citizen of the Republic of France, residing at Paris, in the Republic of France, have invented certain new and useful Improvements in Starting and Regulating of the Speed of Dynamo-Electric Machines, of which the following is a specification.

In my co-pending applications Nos. 702,074, 734,542 and 758212 there has been described a system for starting, regulating and braking traction motors. This method consists of employing an auxiliary machine which is provided with two excitations, one of which is constant in value and the other of which is variable and is of such a value as to produce an electromotive force at its terminals which is proportional and substantially equal to the electromotive force applied thereto. This dynamo is driven at constant speed and due to its excitations it is adapted to take in or give out a current of substantially constant value. This machine when connected in series with series or other motors across the mains is excellently adapted to start, control and regulate them and to have a regenerative action. In establishing and stabilizing the braking conditions when applied to series motors it is necessary to provide means to prevent the current rising to too high a value due to the shunt winding across the regulating machine being comparatively slow in action due to its high inductance and for that reason in the above applications various means have been proposed in order to prevent this sudden rise of current. In one method described in my co-pending application No. 758,212 the field windings of the motors are shunted by the armature of an auxiliary dynamo running at approximately constant speed and provided with two excitation windings, one having its ampere turns constant in value and direction and the other having its ampere turns variable both in value and direction and proportional to the potential across the brushes of the regulator. In said application it was also mentioned that the circuit of the field windings of the traction motors and the auxiliary dynamo could be isolated from the main circuit and that this method may be employed just as well for starting as for braking.

The object of the present invention is to arrange such circuits so that they can be controlled entirely from circuits through which the main current of the motor does not pass.

The above applications describe particularly the application of the method in the case of direct current mains. The present invention shows means of applying this same method to alternating current mains, although of course for certain characteristics of the invention the direct current motors may be employed. Preferably the alternating current motor is reversible so that regenerative action may be obtained.

Figure 2:
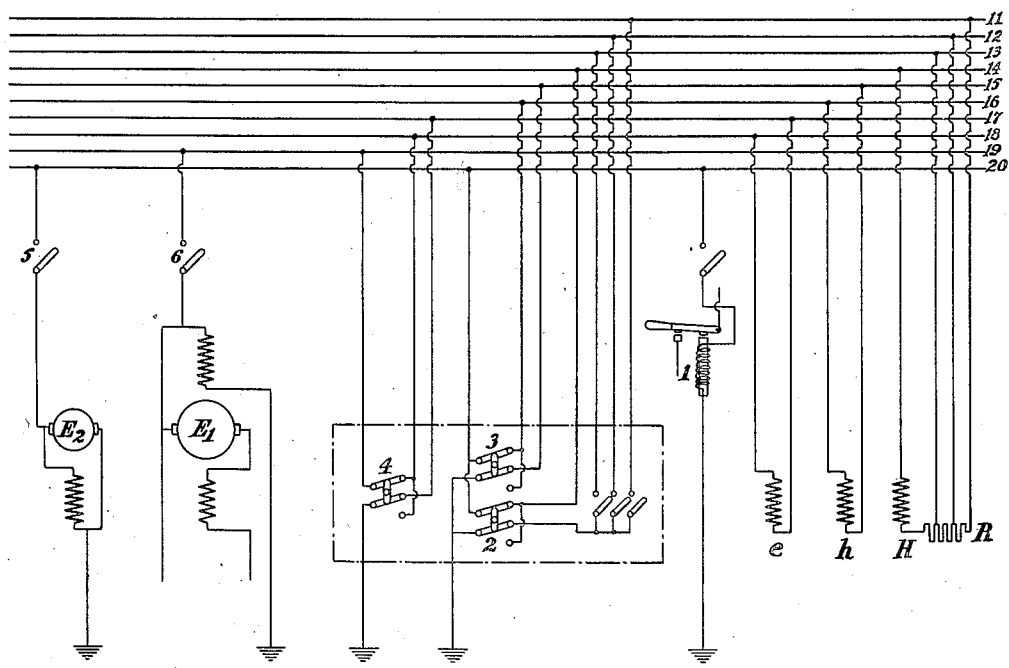

Referring to the accompanying drawings, Figure 1 shows diagrammatically an equipment arranged according to the present invention, while Fig. 2 shows an arrangement of intercommunicating wires connecting the sets of one coach of a train to other coaches whereby the train may be controlled from a number of stations.

In the drawing X is the line supplying single-phase current; T is the earth; $F^1$ is the armature of the regulator; E, H, S, are the excitation windings; $F^2$ is the reversible single-phase motor driving the regulator $F'$. In the diagram it is assumed that it is a single-phase commutation motor which can start by the simple closing of the switch 1.

$M'$ $M^2$ are the armatures of the traction motors of which, by way of example, two are considered. $m'$ $m^2$ are the field windings of these motors. The armatures $M'$ $M^2$ as well as the field windings $m'$ $m^2$ are connected in series. It is evident they could also be connected in parallel.

$E^2$ is an exciter at constant voltage feeding the exciting windings H and the exciting winding $h$ of an exciter $E'$, as will be seen hereafter.

$E'$ is the exciter of variable potential feeding the field windings of the traction motors. This exciter is driven at an approximately constant speed and could be placed, for example, at the end of the shaft of the regulator $F'$ or that of the exciter $E^2$.

$h$ and $e$ are the exciting windings of the exciter $E'$; the one $h$, being fed by the exciter $E^2$ or from any other source, has a constant value, and the other $e$ placed across the terminals of the winding E has a variable value. These two windings $h$ and $e$ act in opposite senses.

2, 3 and 4 are the reversing switches for reversing the direction of the currents in the corresponding excitation windings.

R is a resistance which by varying it allows different rates of starting and braking to be obtained.

It will be noticed that the winding E of the machine F' is connected to the brushes of one of the armatures $M^2$ of the traction motors. This arrangement which differs from the previous applications in which the winding E was connected to the brushes of the machine F' is simply a variation; as the voltage of the brushes of the special machine F' is always equal to the sum of the voltages across the brushes of the two armatures M' $M^2$ and is in consequence proportional to the voltage across the brushes of one of the traction motors. This arrangement has, however, in the example considered, besides other advantages, that of submitting the shunt winding E to a voltage only one half of that of the regulator F' and so simplifying the construction of this winding. The arrows M, Fr, AV, AR, shown in the drawing, avoiding the necessity of giving further explanations, represent the direction of the flux in the windings: M for the starting; Fr for the braking; AV for "forward" and AR for "reverse". The advantage of performing all the operations by acting upon weak currents is an important consideration in the case of trains driven by these equipments in multiple traction units. By way of example, it will be shown how such an equipment can be operated, it being understood that this arrangement is capable of numerous modifications in detail. Setting aside safety appliances the apparatus on the continuous current side will consist solely of a controller with two handles, one a "forward" and "reversing" handle controlling the exciting windings of the exciter E', second, a "starting" and "braking" handle controlling the independent excitation of the regulator F'.

The arrangement for controlling the various carriages will be better understood by referring to Fig. 2, in which references 11 to 20 indicate the intercommunicating wires between the different carriages. The exciter $E^2$ is connected to the wire 20 as are also the electromagnets 1 controlling the switch of each of the single phase commutation motors $F^2$. Consequently all these motors will start and drive their corresponding regulators F'. In order to regulate the excitation of the motors and the excitation of the regulators and generally to regulate the machine both as regards moving either forward or backward or for braking purposes, the other intercommunication wires are employed which can be all controlled by a single controlling arrangement. For instance, the switch 6 of any carriage is connected to the intercommunication wire 19. This is also connected to one side of the reversing switch 4 of any of the controlling arrangements. Comparing this figure with Fig. 1, it will be noted that by either a direct connection or a reversible connection the exciter controlling the field windings can have its electromotive force reversed when desired, just as in a single arrangement. This voltage is connected to the wires 17 and 18 which are in turn connected to the excitation $e$ of this arrangement. The excitation $h$ is connected to the intercommunicating wires 15 and 16 and from thence to one side of the switch 3 of any controlling arrangement, the other side of this switch being connected to the intercommunicating wire 20, which of course serves for providing the constant current. The arrangement for controlling the current of the system, which depends on the current flowing through the winding H, is regulated by means of the intercommunicating wires 11, 12, 13 and 14 which are connected respectively to the separate selected resistances R and to the winding H. These wires are connected to the reverse side of the reversing switch 2, and any selected resistance can be placed in circuit. It will be at once clear that by this means the simple operation of either of the switches 2, 3 and 4, and also the closing of the switches 5 and 6, can entirely control all the sets on the train, and even if one set is damaged, it is possible to work the apparatus by means of other sets. The switch 1 may be both manually and electromagnetically controlled, so that if desired the switch 1 of any carriage may be manually closed in order to start the motor $F^2$ in circuit therewith. By this means it is possible to obtain the control of the starting of the sets in any carriage whatever, and to control this arrangement whatever degrees of starting or of braking of forward or of reverse motion may be required, even in case of damage to the set of the leading carriage. It will be seen that this arrangement employing ten intercommunicating wires gives three values of the resistance R, although it will be understood that other values can be employed by employing further intercommunicating wires. It is possible to reduce the number of these intercommunication wires by employing special simplifying arrangements. For instance, the above has not been limited to any particular value of the constant potential of the exciter $E^2$, consequently this could have any value whatever, assuming that this value was equal to the maximum theoretical value V of the traction motors, that is to say a voltage slightly greater in value than that which can be obtained practically.

The resistance R is illustrated as variable in Fig. 2 by employing the three switches as shown for varying its value. The system of control shown in the drawing has been described. Further, the train control system is illustrated in a new Fig. 2. This system also shows the controller with two handles and also the switch 1 which is both manually and electromagnetically controlled.

The difference of potential between the points A and B will change from V volts to a less value because the point A is V volts above the potential of the earth and B varies from no volts to V volts being the voltage across the motor $M_2$. This difference of potential being proportional to the resultant ampere turns necessary for the excitation of E′ and attained by the windings $h$ and $e$; it will be possible in this case to replace the two excitation windings of E′ by a single one and in this manner do away with two of the inter-communicating wires.

It will be noticed that the connections for forward braking may be the same as for the reverse starting, and vice versa. In these conditions it is not essential to reverse the current both in the exciting windings of the exciter E′ and of the regulator F′. This circumstance renders possible a simplification of the equipment.

It will be understood that the methods employed above are capable of variations which will not depart from the principle of the invention. The method of stabilizing the system of regeneration employed in the present equipment is characterized by the feature that the driving motors have an excitation independent of the current circulating in their armatures and proportional to the algebraical sum of the two voltages, one of which is constant and the other proportional to the voltage across the brushes of the regulator if the auxiliary machine E′ is not saturated. In consequence this auxiliary exciter E′ can be eliminated and the excitation proportional to that of the said auxiliary machine can be furnished directly to the field windings of the traction motors. This solution not only allows of the elimination of the auxiliary machine but also provides the further advantage of reducing the weight and the space required by the set, a very important advantage in certain cases.

It is important to notice that the elimination considered above of the auxiliary machine E′ is not limited to the case of an alternating current system, an analogous method being applicable with direct current mains. Also it will be possible to apply to the exciter E′ the methods of excitation as described in the previous patents, some of the methods of excitation being directly applicable to the motors will in such cases entail the elimination of the said exciter E′.

I declare that what I claim is:—

1. An electric system comprising in combination a dynamo electric machine adapted to generate an electro-motive force which is the resultant of two electro-motive forces, one of which is constant in value and the other is proportional to the voltage at the terminals of the machine, means for driving said machine at constant speed, a motor, connections between said motor and said dynamo electric machine, a field winding on said motor isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

2. An electric system comprising in combination a dynamo electric machine adapted to generate an electro-motive force which is the resultant of two electro-motive forces, one of which is constant in value and the other is proportional to the voltage at the terminals of the machine, electric supply mains, an electric motor connected to said electric supply mains and adapted to maintain said dynamo electric machine at constant speed, a motor, connections between said motor and said dynamo electric machine, a field winding on said motor and isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

3. An electric regenerative system comprising in combination a dynamo electric machine adapted to generate an electro-motive force which is the resultant of two electro-motive forces, one of which is constant in value and the other is proportional to the voltage at the terminals of the machine, electricity supply means, a reversible electric motor connected across said supply mains and adapted to drive said dynamo electric machine at constant speed, a second motor, connections between said motor and said dynamo electric machine, a field winding on said second motor and isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

4. An electric regenerative system comprising in combination a dynamo electric machine adapted to generate an electro-motive force which is the resultant of two electro-motive forces, one of which is constant in value and the other is proportional to the voltage at the terminals of the machine, alternating current supply mains, an alternating current motor reversible in action connected to said supply mains to drive said dynamo electric machine at constant speed, a motor, connections between said motor and said dynamo electric machine a field winding on said motor and isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

5. An electric system comprising in combination a dynamo electric machine adapted to generate an electro-motive force which is the resultant of two electro-motive forces, one of which is constant in value and the other is proportional to the voltage at the terminals of the machine, single phase supply mains, a single phase commutation electric motor connected across said mains and adapted to drive said dynamo electric machine at constant speed, a motor, connections between said motor and said dynamo electric machine, a field winding on said motor and isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

6. An electric system comprising in combination a dynamo electric machine adapted to generate an electro-motive force which is the resultant of two electro-motive forces, one of which is constant in value and the other is equal to the voltage at the terminals of the machine, an alternating current electric motor to drive said dynamo electric machine at constant speed, a motor, connections between said motor and said dynamo electric machine, a field winding on said motor and isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

7. An electric system comprising in combination a motor, a dynamo electric machine adapted to generate an electromotive force which is the resultant of two electro-motive forces, one of which is constant in value and the other is proportional to the voltage across said motor, an alternating current electric motor to drive said dynamo electric machine at constant speed, connections between said motor and said dynamo electric machine, a field winding on said motor and isolated from the main circuit, a variable exciter for exciting said field winding, means for giving said exciter an electro-motive force the component of two electro-motive forces, one constant and the other variable in value, and means for controlling said motor field winding, said means being placed in circuits other than that of the field winding or the motor circuit.

8. An electric system comprising in combination a dynamo electric machine adapted to generate an electro-motive force which is the resultant of two electro-motive forces, one of which is constant in value and the other is equal to the voltage at the terminals of the machine, an alternating current electric motor driving said dynamo electric machine at constant speed, a motor, connections between said motor and said dynamo electric machine, a field winding on said motor and isolated from the main circuit, a variable exciter for exciting said field winding, means for giving said exciter an electro-motive force the component of two electro-motive forces, one constant and the other variable in value, means for controlling said motor field winding, said means being placed in circuits other than that of the field winding or the motor circuit, and means for maintaining the variable voltage of said dynamo electric machine in phase with the voltage across the terminals of said machine.

9. An electric system comprising in combination a dynamo electric machine, a motor, connections between said motor and said dynamo electric machine, an alternating current motor for driving said dynamo electric machine at constant speed, three field windings on said dynamo electric machine, one in series with said motor, one connected across the terminals of said motor and one constant in value, a field winding on said motor, an exciter for exciting said field winding isolated from the motor circuit, two field windings on said exciter, one constant in value and the other proportional to the voltage across said motor, and controlling means in the circuit of the field windings of the exciter and in the constant field winding of said dynamo electric machine.

10. An electric system comprising in combination a dynamo electric machine, a motor, connections between said motor and said dynamo electric machine, an alternating current motor for driving said dynamo electric machine at constant speed, three field windings on said dynamo electric machine, one in series with said motor, one connected across the terminals of said motor, and one constant in value, a field winding on said motor, an exciter for exciting said field winding isolated from the motor circuit, two field windings on said exciter, one constant in value and the other proportional to the voltage across said motor, reversing switches in the circuit of said field windings of said exciter, a reversing switch and a regulating resistance in the circuit of the constant field winding of said dynamo electric machine, and a variable resistance in the circuit of said field winding.

11. An electric system comprising in combination a dynamo electric machine, a motor, connections between said motor and said dynamo electric machine, a single phase commutation motor, a switch capable of being controlled by hand and by electro-magnetic means for starting said single phase commutation motor, three field windings on said dynamo electric machine, one in series with said first mentioned motor, one connected across the terminals of said first mentioned motor, and one constant in value, a field winding on said first mentioned motor, an exciter for exciting said field winding and isolated from the motor circuit, two field windings on said exciter one constant in value and the other proportional to the voltage across said motor, reversing switches in the circuit of the field windings of said exciter, a reversing switch and a regulating resistance in the circuit of the constant field winding of said dynamo electric machine.

12. An electric system comprising in combination a dynamo electric machine, a motor, connections between said motor and said dynamo electric machine, an alternating current motor for driving said dynamo electric machine at constant speed, three field windings on said dynamo electric machine, one in series with said motor, one connected across the terminals of said motor and one constant in value, a field winding on said motor, an exciter for exciting said field winding and isolated from the motor circuit, two field windings on said exciter, one constant in value and the other proportional to the voltage across said motor, controlling means in the circuit of the field windings of the exciter and in the constant field winding of said dynamo electric machine, and a second auxiliary exciter supplying current for the constant current windings of said dynamo electric machine and of said first exciter.

13. An electric system comprising in combination a dynamo electric machine adapted to generate an electro-motive force which is the resultant of two electro-motive forces, one of which is constant in value and the other is proportional to the voltage at the terminals of the machine, an alternating current electric motor driving said dynamo electric machine at constant speed, a plurality of traction motors, connections between said motor and said dynamo electric machine, field windings on said motors and isolated from the main circuit, a variable exciter for exciting said field windings, means for giving said exciter an electro-motive force the component of two electro-motive forces, one constant and the other variable in value, and means for controlling said motor field windings, said means being placed in circuits other than that of the field windings or the motor circuit.

14. An electric system comprising in combination a number of independent sets, each set comprising in combination a dynamo electric machine, a motor, connections between said motor and said dynamo electric machine, an alternating current motor for driving said dynamo electric machine at constant speed, three field windings on said dynamo electric machine, one in series with said motor, one connected across the terminals of said motor and one constant in value, a field winding on said motor, an exciter for exciting said field winding isolated from the motor circuit, two field windings on said exciter, one constant in value and the other proportional to the voltage across said motor, controlling means in the circuit of the field windings of the exciter and in the constant field winding of said dynamo electric machine, and inter-communication wires between said sets so arranged as to operate all the sets by the operation of the controlling means of one set.

15. An electric system comprising in combination a number of independent sets each set comprising in combination a dynamo electric machine, a motor, connections between said motor and said dynamo electric machine, an alternating current motor for driving said dynamo electric machine at constant speed, three field windings on said dynamo electric machine, one in series with said motor, one connected across the terminals of said motor, and one constant in value, a field winding on said motor, an exciter for exciting said field winding isolated from the motor circuit, two field windings on said exciter, one constant in value and the other proportional to the voltage across said motor, reversing switches in the circuit of said field windings of said exciter, a reversing switch and a regulating resistance in the circuit of the constant field winding of said dynamo electric machine, a variable resistance in the circuit of said field winding, and inter-communication wires between said sets so arranged as to operate all the sets by the operation of the controlling means of one set.

16. An electric system comprising in combination a number of independent sets each set comprising in combination a dynamo electric machine, a motor, connections between said motor and said dynamo electric machine, a single phase commutation motor, a switch capable of being controlled by hand and by electro-magnetic means for starting said single phase commutation motor, three field windings on said dynamo electric machine, one in series with said first mentioned motor, one connected across the terminals of said first mentioned motor, and one constant in value, a field winding on said first mentioned motor, an exciter for exciting said field winding and isolated from the motor circuit, two field windings on said exciter, one constant in value and the other proportional to the voltage across said motor, reversing switches in the circuit of the field windings of said exciter, a reversing switch and a regulating resistance in the circuit of the constant field winding of said dynamo electric machine, a variable resistance in the circuit of said field winding, and inter-communication wires between said sets so arranged as to operate all the sets by the operation of the controlling means of one set.

17. An electric system comprising in combination a number of independent sets each set comprising in combination a dynamo electric machine, a motor, connections between said motor and said dynamo electric machine, an alternating current motor for driving said dynamo electric machine at constant speed, three field windings on said dynamo electric machine, one in series with said motor, one connected across the terminals of said motor and one constant in value, a field winding on said motor, an exciter for exciting said field winding and isolated from the motor circuit, two field windings on said exciter, one constant in value and the other proportional to the voltage across said motor, controlling means in the circuit of the field windings of the exciter and in the constant field winding of said dynamo electric machine, a second auxiliary exciter supplying current for the constant current windings of said dynamo electric machine and of said first exciter, and inter-communication wires between said sets so arranged as to operate all the sets by the operation of the controlling means of one set.

18. An electric system comprising in combination a dynamo electric machine, a plurality of motors in series with said machine, means whereby the excitation of said motors is such as to be the sum of two excitations, one of which is constant in value and the other proportional to the voltage across the terminals of said motors, means for driving said dynamo electric machine at constant speed, and means for controlling said motors by controlling their excitations.

19. An electric system comprising in combination a number of independent sets each set comprising in combination a dynamo electric machine, a plurality of motors in series with said machine, means whereby the excitation of said motors is such as to be the sum of two excitations, one of which is constant in value and the other proportional to the voltage across the terminals of said motors, means for driving said dynamo electric machine at constant speed, means for controlling said motors by controlling their excitations and inter-communication wires between said sets so arranged as to operate all the sets by the operation of the controlling means of one set.

20. An electric system comprising in combination a dynamo electric machine, a plurality of motors in series with said machine, two excitations on said dynamo electric machine, one of which is constant in value and the other proportional to the voltage across the terminals of one of said motors, means whereby the excitation of said motors is such as to be the sum of two excitations, one of which is constant in value and the other proportional to the voltage across the terminals of said motors, means for driving said dynamo electric machine at constant speed, and means for controlling said motors by controlling their excitations.

21. An electric system comprising in combination a dynamo electric machine, three excitations on said dynamo electric machine, one of which is constant in value, another proportional to the voltage across the terminals of one of said motors, and the other is proportional to the current flowing through said motors, a plurality of motors in series with said machine, means whereby the excitation of said motors is such as to be the sum of two excitations, one of which is constant in value and the other proportional to the voltage across the terminals of said motors, means for driving said dynamo electric machine at constant speed, and means for controlling said motors by controlling their excitations.

In witness whereof, I have hereunto signed my name this 3d day of January, 1914, in the presence of two subscribing witnesses.

FERNAND CUMONT.

Witnesses:
ALPHONSE MÉJEAN,
HANSON C. COXE.